(12) United States Patent
Shaik et al.

(10) Patent No.: US 11,319,914 B2
(45) Date of Patent: May 3, 2022

(54) METHOD AND DEVICE FOR REMOTELY STARTING MANUAL TRANSMISSION VEHICLE

(71) Applicants: Hyundai Motor Company, Seoul (KR); Kia Motors Corporation, Seoul (KR)

(72) Inventors: Asjad Ahmed Shaik, Telangana (IN); Sung Kwan Choo, Gyeonggi-do (KR); Yong Suk Park, Seoul (KR); Sitarama Murthy Manuru, Telangana (IN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/081,604

(22) Filed: Oct. 27, 2020

(65) Prior Publication Data

US 2022/0049675 A1    Feb. 17, 2022

(30) Foreign Application Priority Data

Aug. 14, 2020 (IN) .............................. 202011035015

(51) Int. Cl.
*F02N 11/08* (2006.01)
*F02N 11/10* (2006.01)

(52) U.S. Cl.
CPC ........ *F02N 11/0807* (2013.01); *F02N 11/103* (2013.01); *B60W 2552/15* (2020.02);
(Continued)

(58) Field of Classification Search
CPC ..................... F02N 11/0807; F02N 2200/0803
See application file for complete search history.

(56) References Cited

U.S. PATENT DOCUMENTS 6,439,675 B1 * 8/2002 Zechmann .............. B60T 13/74
                                                        303/191
6,508,341 B1 * 1/2003 Hiura ...................... B60T 7/045
                                                        188/216
(Continued)

FOREIGN PATENT DOCUMENTS

JP         H0986219 A     3/1997
KR         97-0014091 U   4/1997
(Continued)

*Primary Examiner* — Kevin R Steckbauer
(74) *Attorney, Agent, or Firm* — Mintz Levin Cohn Ferris Glovsky and Popeo, P.C.; Peter F. Corless

(57) ABSTRACT

A method for remotely starting a manual transmission vehicle is provided. The method includes determining whether remote start of the manual transmission vehicle is possible based on a remote start command signal of a remote start input device, an inclination angle signal value of the manual transmission vehicle, a notch signal value generated when a parking brake of the manual transmission vehicle is operated by moving a lever of the parking brake, and a gear shift stage signal of a manual transmission of the manual transmission vehicle. An engine of the manual transmission is started when the notch signal value according to the inclination angle signal value is greater than or equal to a minimum value of notch signal values capable of remotely starting the manual transmission vehicle and the gear shift stage signal is a neutral stage signal.

8 Claims, 6 Drawing Sheets

(52) U.S. Cl.
CPC ............ *F02N 11/10* (2013.01); *F02N 11/101* (2013.01); *F02N 2200/0802* (2013.01); *F02N 2200/0803* (2013.01)

(56) References Cited

U.S. PATENT DOCUMENTS

| | | | | |
|---|---|---|---|---|
| 6,935,984 B2* | 8/2005 | Tiesler | ...................... | F16H 3/66 475/276 |
| 7,140,997 B2* | 11/2006 | Tiesler | ...................... | F16H 3/66 475/278 |
| 7,474,943 B2* | 1/2009 | Matsubara | ............ | F02N 11/101 701/2 |
| 7,587,960 B2* | 9/2009 | Tsuzuki | .................. | B60T 7/105 74/523 |
| 7,634,333 B2* | 12/2009 | Matsubara | ............ | F02N 11/101 701/2 |
| 7,828,124 B2* | 11/2010 | Sano | ........................ | F16D 65/18 188/156 |
| 7,947,943 B2* | 5/2011 | Jaskol | .................... | B60R 22/48 250/215 |
| 8,155,810 B2* | 4/2012 | Miyauchi | ................ | B60L 15/40 701/20 |
| 8,308,607 B2* | 11/2012 | Christen | ............. | F02N 11/0822 477/73 |
| 8,347,749 B2* | 1/2013 | Guggolz | ................ | B60W 10/11 74/335 |
| 8,395,375 B2* | 3/2013 | Konno | .................. | H01H 36/00 324/207.25 |
| 8,862,355 B2* | 10/2014 | Gibson | ................ | B60W 10/115 701/70 |
| 8,888,133 B2* | 11/2014 | Tsuchihashi | ........... | A01D 34/64 280/779 |
| 8,985,711 B2* | 3/2015 | Tomczak | .............. | B60T 13/662 303/89 |
| 9,017,216 B1* | 4/2015 | Holub | .................. | B60W 10/06 477/94 |
| 9,221,435 B2* | 12/2015 | Yamanaka | ............... | B60T 11/06 |
| 9,308,899 B2* | 4/2016 | Uchimura | ........... | F02N 11/0833 |
| 9,457,688 B2* | 10/2016 | Morita | .................... | B60L 50/13 |
| 9,487,192 B2* | 11/2016 | Ohki | ....................... | G05G 5/24 |
| 9,517,754 B2* | 12/2016 | Murata | ..................... | B60T 8/17 |
| 9,568,057 B2* | 2/2017 | Kwon | .................... | F16D 65/18 |
| 9,701,312 B2* | 7/2017 | Jensen | ............ | B60W 30/18027 |
| 9,731,624 B2* | 8/2017 | Morita | .................... | B60T 8/885 |
| 9,915,303 B1* | 3/2018 | Parada Centeno | ..... | F16D 28/00 |
| 10,018,171 B1* | 7/2018 | Breiner | ............... | F02N 11/0807 |
| 10,082,402 B2* | 9/2018 | Jung | ....................... | G01C 21/3415 |
| 10,093,292 B2* | 10/2018 | Moore | .................. | B60T 13/588 |
| 10,252,708 B2* | 4/2019 | Kim | ........................ | B60T 17/22 |
| 10,393,083 B2* | 8/2019 | Boulais | ................ | F02N 11/103 |
| 10,421,456 B2* | 9/2019 | Khafagy | ................ | F02N 11/0822 |
| 10,444,252 B2* | 10/2019 | Moore | .................. | F02N 11/0837 |
| 10,501,080 B2* | 12/2019 | Khafagy | ................ | B60W 10/08 |
| 10,995,722 B2* | 5/2021 | Spitz | ...................... | F02N 11/087 |
| 2005/0010336 A1* | 1/2005 | Matsubara | .......... | F02N 11/0807 701/2 |
| 2005/0026735 A1* | 2/2005 | Tiesler | ...................... | F16H 3/66 475/269 |
| 2005/0026742 A1* | 2/2005 | Tiesler | ...................... | F16H 3/66 475/284 |
| 2006/0186388 A1* | 8/2006 | Thune | ..................... | B66D 5/14 254/347 |
| 2007/0170775 A1* | 7/2007 | Uchimura | ............... | B60T 7/122 303/112 |
| 2008/0041673 A1* | 2/2008 | Tsuzuki | .................. | B60T 7/105 188/2 R |
| 2008/0303260 A1* | 12/2008 | Jaskol | .................... | B60R 22/48 280/801.1 |
| 2009/0099711 A1* | 4/2009 | Matsubara | ........... | F02D 41/064 701/2 |
| 2009/0248219 A1* | 10/2009 | Kawauchi | ............... | B60R 25/33 701/1 |
| 2009/0251284 A1* | 10/2009 | Wilson | ................ | F02N 11/0807 340/5.64 |
| 2010/0280683 A1* | 11/2010 | Miyauchi | ........... | B61L 27/0038 701/20 |
| 2011/0204883 A1* | 8/2011 | Konno | ................... | H01H 36/00 324/207.25 |
| 2012/0196723 A1* | 8/2012 | Christen | ......... | B60W 30/18018 477/167 |
| 2012/0228080 A1* | 9/2012 | Fitzgerald | ............... | F16H 3/093 192/219.2 |
| 2012/0260757 A1* | 10/2012 | Guggolz | ........... | F16H 61/0403 74/335 |
| 2012/0271523 A1* | 10/2012 | Sardari Iravani | ....... | B60T 13/74 701/70 |
| 2012/0330522 A1* | 12/2012 | Gibson | ........... | B60W 30/18018 701/70 |
| 2013/0158838 A1* | 6/2013 | Yorke | ............ | B60W 30/18018 701/103 |
| 2013/0175124 A1* | 7/2013 | Tomczak | .............. | B60T 13/662 188/106 F |
| 2014/0062075 A1* | 3/2014 | Tsuchihashi | ......... | A01D 34/662 280/779 |
| 2014/0224601 A1* | 8/2014 | Yamanaka | ............... | B60T 7/085 188/204 R |
| 2015/0159613 A1* | 6/2015 | Jensen | ........... | B60W 30/18027 701/68 |
| 2015/0175137 A1* | 6/2015 | Murata | .................... | B60T 7/107 701/70 |
| 2015/0224895 A1* | 8/2015 | Morita | ....................... | E02F 9/207 318/494 |
| 2015/0298662 A1* | 10/2015 | Ohki | ....................... | B60T 7/045 74/512 |
| 2016/0272170 A1* | 9/2016 | Moore | .................. | B60T 13/588 |
| 2016/0369726 A1* | 12/2016 | Moore | .................. | B60T 13/662 |
| 2017/0001539 A1* | 1/2017 | Morita | .................... | B60L 3/0084 |
| 2017/0203762 A1* | 7/2017 | Khafagy | ................ | B60T 7/122 |
| 2018/0111596 A1* | 4/2018 | Kim | ........................ | B60T 7/16 |
| 2018/0156632 A1* | 6/2018 | Jung | ....................... | B62D 15/027 |
| 2018/0237016 A1* | 8/2018 | Khafagy | ................ | B60T 8/32 |
| 2018/0340502 A1* | 11/2018 | Boulais | ................ | F02N 11/0807 |
| 2020/0088150 A1* | 3/2020 | Spitz | ..................... | A01D 34/006 |
| 2020/0309262 A1* | 10/2020 | Kirchner | ............. | F16D 63/006 |
| 2020/0361431 A1* | 11/2020 | Park | ........................ | B60T 7/122 |
| 2021/0107453 A1* | 4/2021 | Shelton | ................ | B60T 13/662 |
| 2021/0180554 A1* | 6/2021 | Park | ........................ | B60Q 9/00 |

FOREIGN PATENT DOCUMENTS

| | | |
|---|---|---|
| KR | 100288539 B1 | 4/2001 |
| KR | 101798526 B1 | 12/2017 |

* cited by examiner

FIG. 6

| Vehicle inclination angle (degree) | Minimum value of notch signal values capable of remotely starting vehicle |
|---|---|
| 5~6 | 6 |
| 6~7 | 7 |
| 7~8 | 8 |
| 8~9 | 10 |
| >9 | 13 |

METHOD AND DEVICE FOR REMOTELY STARTING MANUAL TRANSMISSION VEHICLE

CROSS REFERENCE TO RELATED APPLICATION(S)

The present application claims priority to Indian Patent Application No. 202011035015 filed on Aug. 14, 2020, the entire contents of which is incorporated herein for all purposes by this reference.

BACKGROUND

(a) Field of the Disclosure

The present disclosure relates to a vehicle, and more particularly, to a method and a device for remotely starting a manual transmission vehicle.

(b) Description of the Related Art

In general, a brake device of a vehicle includes a main brake mainly used while the vehicle is being driving and a parking brake to maintain the vehicle in a parked state. Since the main brake is operated by a foot of a driver of the vehicle, the main brake is referred to as a foot brake. Additionally, since the parking brake is operated by the driver's hand, the parking brake is referred to as a hand brake or a side brake. The foot brake uses a hydraulic pressure type brake and the hand brake uses a mechanical type brake.

In the parking brake, a handle or a lever installed in a console box is pulled to pull a brake cable so that a brake pad is in close contact with a rear wheel of the vehicle. The vehicle is parked by a frictional force due to the brake pad. The parking brake lever is installed in a rectangular slit of the console box. The parking brake is operated when the parking brake lever is pulled upward, and the parking brake is released when the parking brake lever is pressed downward. When the driver moves a gear shift lever to a neutral state and remotely starts the vehicle without operating the parking brake, the vehicle in the neutral state may still move thus increasing the risk of an accident.

The above information disclosed in this section is merely for enhancement of understanding of the background of the disclosure, and therefore it may contain information that does not form the prior art that is already known in this country to a person of ordinary skill in the art.

SUMMARY

The present disclosure provides a method and a device for remotely starting a manual transmission vehicle capable of safely and remotely starting the vehicle.

An exemplary embodiment of the present disclosure provides the method for remotely starting the manual transmission vehicle that may include: determining, by a controller, whether remote start of the manual transmission vehicle is possible based on a remote start command signal of a remote start input device, an inclination angle signal value of the manual transmission vehicle, a notch signal value generated when a parking brake of the manual transmission vehicle is operated by moving a lever of the parking brake, and a gear shift stage signal of a manual transmission of the manual transmission vehicle; and starting, by the controller, an engine of the manual transmission when the notch signal value according to the inclination angle signal value is greater than or equal to a minimum value of notch signal values capable of remotely starting the manual transmission vehicle and the gear shift stage signal is a neutral stage signal.

The controller may be configured to calculate the inclination angle signal value of the manual transmission vehicle based on a longitudinal acceleration of the manual transmission vehicle that is an output signal value of an acceleration sensor of the manual transmission vehicle. The controller may be configured to receive the notch signal value from a parking brake notch sensor that is a non-contact type sensor and configured to detect that a pawl of the parking brake is positioned on a notch of a gear of the parking brake.

The controller may be configured to check whether the gear shift stage signal is the neutral stage signal using an output signal of a gear shift stage sensor configured to detect a gear position of the manual transmission and a gear shift stage position of a gear shift lever adjusting the manual transmission. The controller may be configured to start the engine using an engine controller configured to receive the gear shift stage signal.

An exemplary embodiment of the present disclosure provides the device for remotely starting the manual transmission vehicle that may include: an acceleration sensor configured to detect a longitudinal acceleration of the manual transmission vehicle; a parking brake notch sensor that is a non-contact type sensor and configured to detect that a pawl of the parking brake of the manual transmission vehicle is positioned on a notch of a gear of the parking brake; a gear shift stage sensor configured to detect a gear position of a manual transmission of the manual transmission vehicle and a gear shift stage position of a gear shift lever adjusting the manual transmission; and a controller configured to determine whether remote start of the manual transmission vehicle is possible based on a remote start command signal of a remote start input device, an inclination angle signal value of the manual transmission vehicle, a notch signal value detected by the parking brake notch sensor when the parking brake is operated by moving a lever of the parking brake, and a gear shift stage signal of the manual transmission detected from the gear shift stage sensor.

The controller may be configured to start an engine of the manual transmission when the notch signal value according to the inclination angle signal value is greater than or equal to a minimum value of notch signal values capable of remotely starting the manual transmission vehicle and the gear shift stage signal is a neutral stage signal. The controller may be configured to start the engine by operating a start motor of the manual transmission vehicle. The controller may include an engine controller configured to start the engine, and the engine controller may be configured to receive the gear shift stage signal.

The method and the device for remotely starting the manual transmission vehicle according to the exemplary embodiment of the present disclosure may remotely start the vehicle in a neutral stage or a neutral gear after checking an appropriate notch signal value of the parking brake according to the inclination angle of the vehicle. Thus, the exemplary embodiment of the present disclosure may safely and remotely start the manual transmission vehicle.

BRIEF DESCRIPTION OF THE DRAWINGS

A brief description of the drawings will be provided to more sufficiently understand the drawings which are used in the detailed description of the present disclosure.

FIG. 6 is a table illustrating a notch signal value of the parking brake according to an inclination angle of the manual transmission vehicle that is capable of remotely starting the vehicle according to an exemplary embodiment of the present disclosure.

DETAILED DESCRIPTION

Figure 1:
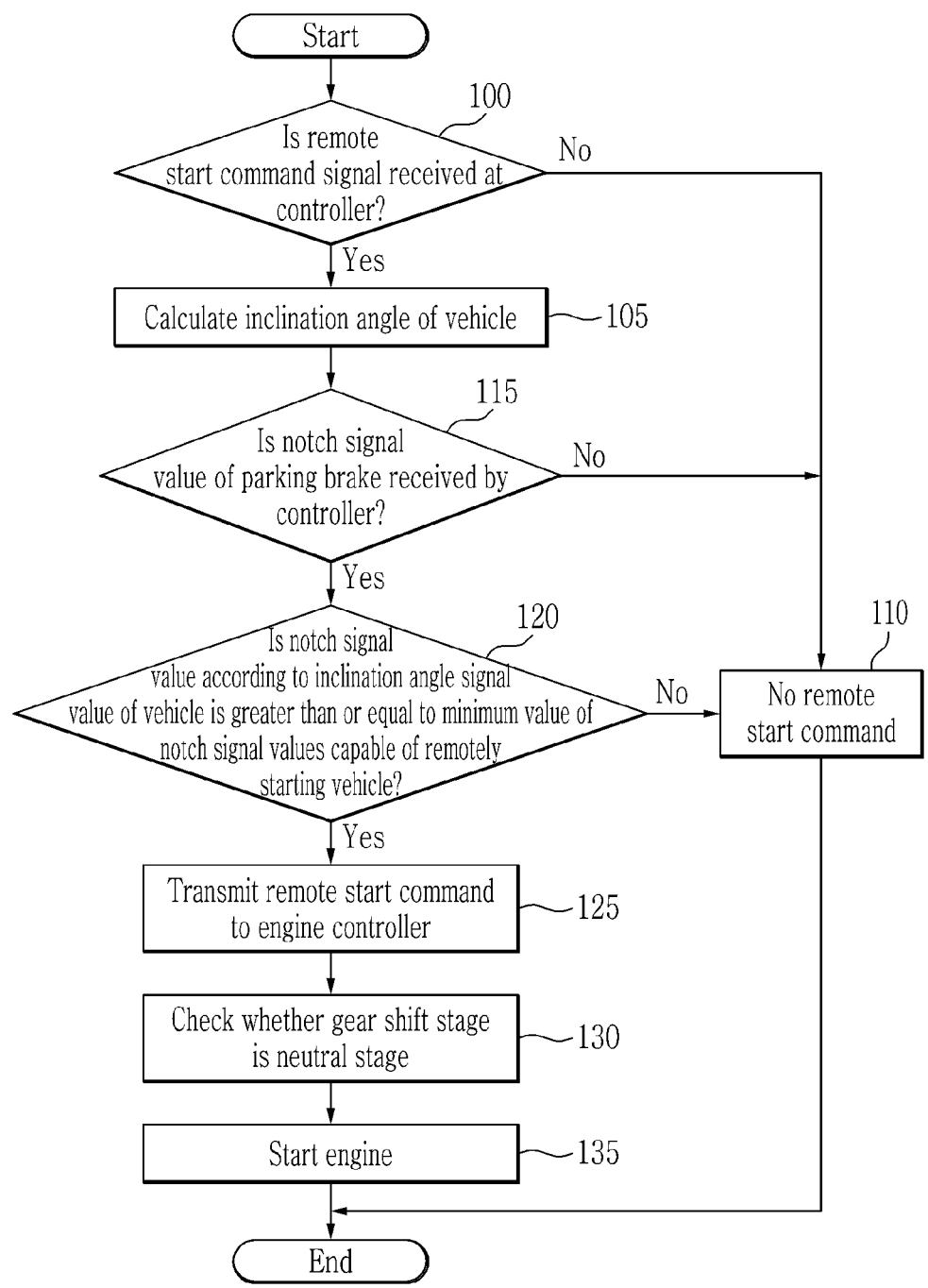
FIG. 1 is a flowchart illustrating a method for remotely starting a manual transmission vehicle according to an exemplary embodiment of the present disclosure.

In order to sufficiently understand the present disclosure and the object achieved by embodying the present disclosure, the accompanying drawings illustrating exemplary embodiments of the present disclosure and contents described in the accompanying drawings are to be referenced.

Hereinafter, the present disclosure will be described in detail by describing exemplary embodiments of the present disclosure with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Terms used in the present specification are only used in order to describe specific exemplary embodiments rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element. Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

Generally, a vehicle having an automatic transmission or a dual clutch transmission (DCT) may use remote start, but a vehicle having a manual transmission may not use remote start because of vehicle safety. Since a vehicle with a manual transmission according to a related art moves at a low notch value of a parking brake when the vehicle is remotely started, the parking brake may not guarantee a safety of a remote start system of the vehicle.

Figure 2:
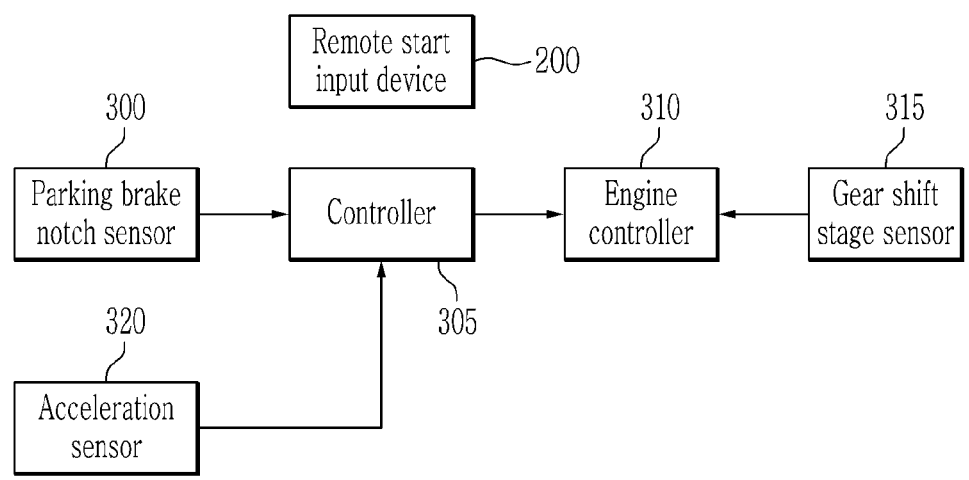
FIG. 2 is a block diagram illustrating a device for remotely starting the manual transmission vehicle to which the method for remotely starting the manual transmission vehicle shown in FIG. 1 is applied according to an exemplary embodiment of the present disclosure.
Figure 3:
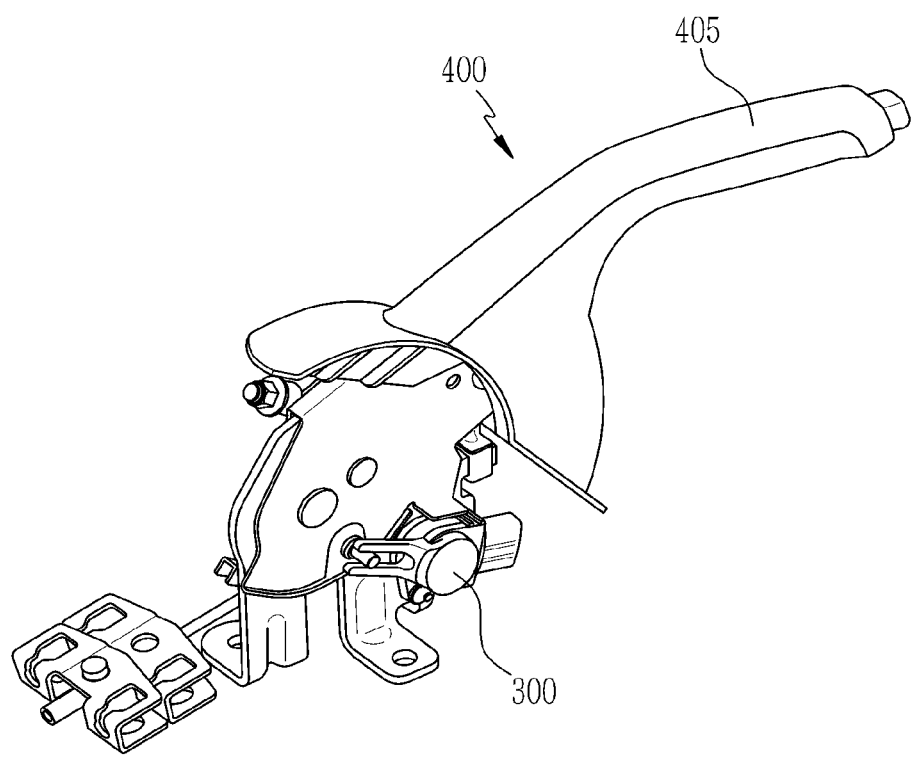
FIG. 3 is a view illustrating a parking brake notch sensor shown in FIG. 2 according to an exemplary embodiment of the present disclosure.
Figure 4:
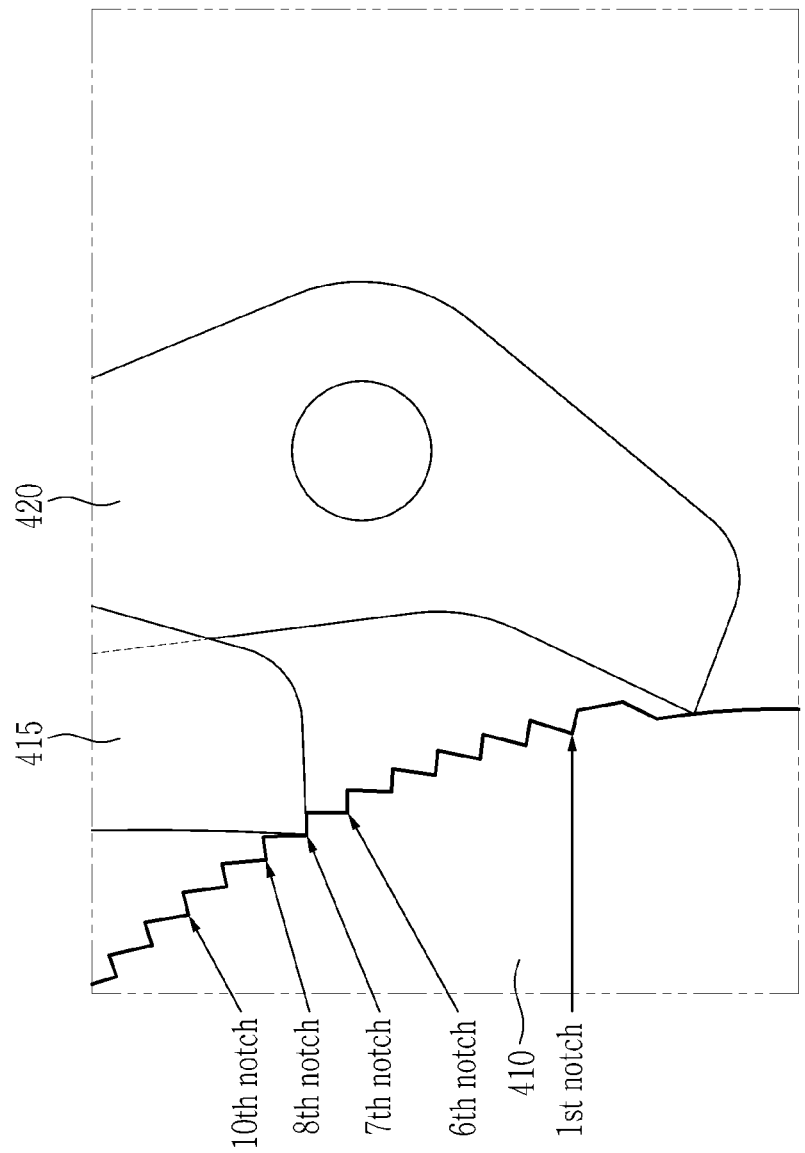
FIG. 4 is a view illustrating a notch of a parking brake shown in FIG. 3 according to an exemplary embodiment of the present disclosure.
Figure 5:
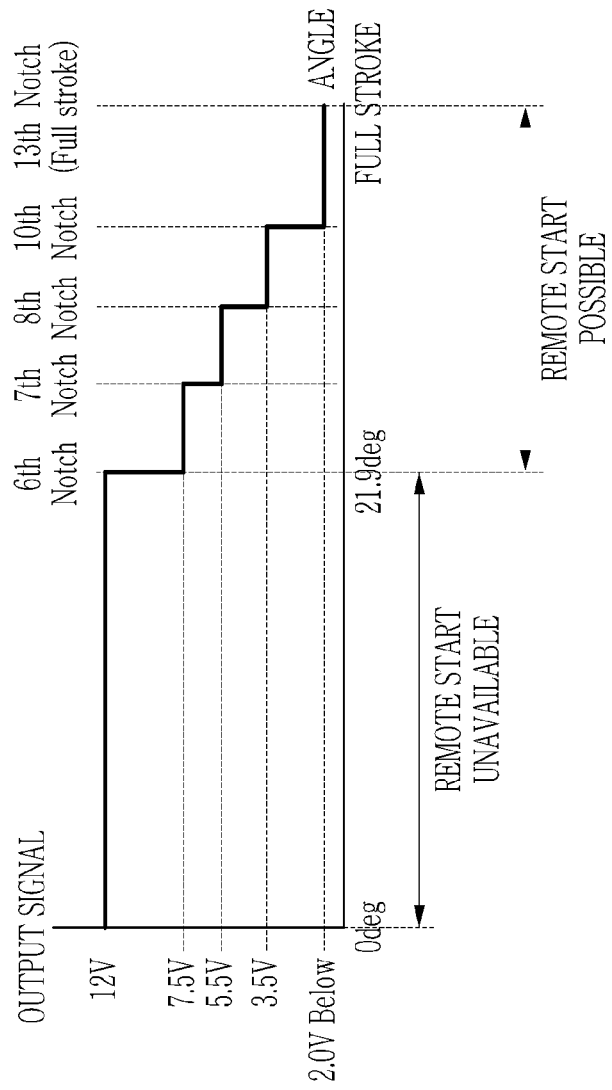
FIG. 5 is a graph illustrating an output signal of the parking brake notch sensor shown in FIG. 2 according to an exemplary embodiment of the present disclosure.

FIG. 1 is a flowchart illustrating a method for remotely starting a manual transmission vehicle according to an exemplary embodiment of the present disclosure. FIG. 2 is a block diagram illustrating a device for remotely starting the manual transmission vehicle to which the method for remotely starting the manual transmission vehicle shown in FIG. 1 is applied. FIG. 3 is a view illustrating a parking brake notch sensor shown in FIG. 2. FIG. 4 is a view illustrating a notch of a parking brake shown in FIG. 3. FIG. 5 is a graph illustrating an output signal of the parking brake notch sensor shown in FIG. 2. FIG. 6 is a table illustrating a notch signal value of the parking brake according to an inclination angle of the manual transmission vehicle that is capable of remotely starting the vehicle according to an exemplary embodiment of the present disclosure.

Referring to FIG. 1 through FIG. 6, in a determination step 100, a controller 305 may be configured to determine whether a remote start command signal is received from a remote start input device 200 to the controller via wireless communication. The manual transmission vehicle may include a parking brake notch sensor 300, the controller 305, an engine controller 310, a gear shift stage sensor 315, and an acceleration sensor 320.

The remote start input device 200 may include a vehicle key device (e.g., a smart key or a fob key) or a portable communication device (e.g., a smart phone). The portable communication device may be configured to provide the remote start command signal to the controller 305 via a telematics server disposed outside the vehicle. When the remote start command signal is not received by the controller 305, the method for remotely starting the manual transmission vehicle may proceed to step 110. When the remote start command signal is received by the controller 305, the process may proceed to step 105.

As shown in FIG. 2, the device for remotely starting the manual transmission vehicle may include a parking brake notch sensor (e.g., a non-contact type sensor such as a Hall effect sensor) 300, the controller 305, the engine controller (e.g., an engine management system) 310, the gear shift stage sensor (e.g., a gear shift stage position sensor) 315, and the acceleration sensor 320.

The controller 305 may be an electronic control unit configured to execute the entire operation of the vehicle. For example, the controller 305 may be one or more microprocessors operated by a program (e.g., control logic) or hardware (e.g., a microcomputer) including the microprocessor. The program may include a series of commands for executing the method for remotely starting the manual transmission vehicle according to the exemplary embodiment of the present disclosure. The commands may be stored in a memory included in the controller 305. For example, the controller 305 may be an integrated body control unit (IBU).

According to step 110 shown in FIG. 1, the controller 305 may not generate a remote start command for the manual transmission vehicle. According to step 105, the controller 305 may be configured to calculate the inclination angle of the manual transmission vehicle based on a longitudinal acceleration of the manual transmission vehicle that is an output signal value of the acceleration sensor 320. For example, the controller 305 may be configured to calculate the inclination angle θ of the manual transmission vehicle using the following equation.

$$\theta = \sin^{-1}\left(\frac{Ax(\text{LONG\_ACCEL})}{9.8}\right)$$

In the equation, Ax(LONG_ACCEL) may be the longitudinal acceleration of the manual transmission vehicle.

For example, the acceleration sensor 320 may be a gravity sensor. The acceleration sensor 320 may be configured to provide the longitudinal acceleration of the manual transmission vehicle to the controller 305 via a powertrain controller area network (P-CAN). In another exemplary embodiment of the present disclosure, the longitudinal acceleration of the manual transmission vehicle may be provided to an electronic stability control (ESC) device of the manual transmission vehicle.

According to step 115, the controller 305 may be configured to determine whether the notch signal value shown in FIG. 5 is received from the parking brake notch sensor 300 via a body controller area network (B-CAN). For example, the notch signal value generated in response to the parking brake 400 being operated by moving a lever 405 of the parking brake shown in FIG. 3 may be an nth notch signal indicating that a pawl or a detent 415 of the parking brake 400 is positioned on or engaged with an nth notch of a gear 410 of the parking brake. For example, the n may be a natural number of 1 or more and 13 or less. When the n is large, a braking force for the vehicle applied by the parking brake 400 may be large. When the n is small, the braking force for the vehicle applied by the parking brake 400 may be small.

The parking brake 400 shown in FIG. 3 may be a lever type brake. When the parking brake lever 405 of the lever type brake is pulled, the pawl 415 and an auxiliary pawl 420 may move to be positioned on the notch of the gear 410 so that a brake cable is pulled. A brake pad may be in close or abutting contact with a rear wheel of the vehicle by the brake cable to stop the vehicle. When the notch signal value is received at the controller 305, the method for remotely starting the manual transmission vehicle may proceed to step 120. When the notch signal value is not received at the controller 305, the process may proceed to step 110.

According to step 120, the controller 305 may be configured to determine whether the notch signal value of based on the inclination angle signal value is greater than or equal to a minimum value of notch signal values capable of remotely starting the manual transmission vehicle. The minimum value of the notch signal values that enables remote start of the manual transmission vehicle according to the inclination angle signal value and is shown in FIG. 6 may be determined by a test or an experiment and may be stored in the memory. Referring to FIG. 6, for example, when the inclination angle signal value is about 5 degrees or greater and about 6 degrees or less, the minimum value of the notch signal values capable of remotely starting the vehicle may be 6.

When the notch signal value according to the inclination angle signal value is less than the minimum value of the notch signal values capable of remotely starting the vehicle, the method for remotely starting the manual transmission vehicle may proceed to step 110. When the notch signal value according to the inclination angle signal value is greater than or equal to the minimum value of the notch signal values capable of remotely starting the vehicle, the process may proceed to step 125.

According to step 125, the controller 305 may be configured to transmit a remote start command for the manual transmission vehicle to the engine controller 310. According to step 130, after step 125, the engine controller 310 may be configured to check or determine whether a gear shift stage of the manual transmission vehicle is a neutral stage using an output signal of the gear shift stage sensor 315 configured to detect a gear position of a manual transmission of the manual transmission vehicle and a gear shift stage position of a gear shift lever adjusting the manual transmission. According to step 135, when the gear shift stage of the manual transmission is the neutral stage, the engine controller 310 may be configured to start an engine of the manual transmission vehicle by operating a start motor of the manual transmission vehicle. In another exemplary embodiment of the present disclosure, since the controller 305 performs a function of the engine controller 310, the controller 305 may include the engine controller 310.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are merely used for the purpose of describing the present disclosure and are not used for qualifying the meaning or limiting the scope of the present disclosure, which is disclosed in the appended claims. Therefore, it will be understood by those skilled in the art that various modifications and equivalent exemplary embodiments are possible from the present disclosure. Accordingly, the actual technical protection scope of the present disclosure must be determined by the spirit of the appended claims.

DESCRIPTION OF SYMBOLS

300: parking brake notch sensor
305: controller
310: engine controller
315: gear shift stage sensor
320: acceleration sensor

What is claimed is:

1. A method for remotely starting a manual transmission vehicle, comprising:
   determining, by a controller, whether remote start of the manual transmission vehicle is possible based on a remote start command signal of a remote start input device, an inclination angle signal value of the manual transmission vehicle, a notch signal value generated in response to a parking brake of the manual transmission vehicle being operated by moving a lever of the parking brake, and a gear shift stage signal of a manual transmission of the manual transmission vehicle;
   determining whether the notch signal value is greater than or equal to a minimum value of notch signal values capable of remotely starting the manual transmission vehicle and the gear shift stage signal is a neutral stage signal, wherein the minimum value is based on the inclination angle signal value; and
   in response to determining that the notch signal value is greater than or equal to the minimum value of the notch signal values, starting, by the controller, an engine of the manual transmission vehicle.

2. The method of claim 1, wherein the controller is configured to calculate the inclination angle signal value of the manual transmission vehicle based on a longitudinal acceleration of the manual transmission vehicle that is an output signal value of an acceleration sensor of the manual transmission vehicle.

3. The method of claim 1, wherein the controller is configured to receive the notch signal value from a parking brake notch sensor that is a non-contact type sensor, wherein the non-contact type sensor is configured to detect that a pawl of the parking brake is positioned on a notch of a gear of the parking brake.

4. The method of claim 1, wherein the controller is configured to check whether the gear shift stage signal is the neutral stage signal using an output signal of a gear shift stage sensor configured to detect a gear position of the manual transmission and a gear shift stage position of a gear shift lever adjusting the manual transmission.

5. The method of claim 1, wherein the controller is configured to start the engine using an engine controller configured to receive the gear shift stage signal.

6. A device for remotely starting a manual transmission vehicle, comprising:
   an acceleration sensor configured to detect a longitudinal acceleration of the manual transmission vehicle;
   a parking brake notch sensor that is a non-contact type sensor and is configured to detect that a pawl of the parking brake of the manual transmission vehicle is positioned on a notch of a gear of the parking brake;
   a gear shift stage sensor configured to detect a gear position of a manual transmission of the manual transmission vehicle and a gear shift stage position of a gear shift lever adjusting the manual transmission; and
   a controller configured to determine whether remote start of the manual transmission vehicle is possible based on a remote start command signal of a remote start input device, an inclination angle signal value of the manual transmission vehicle, a notch signal value detected by the parking brake notch sensor when the parking brake is operated by moving a lever of the parking brake, and a gear shift stage signal of the manual transmission detected from the gear shift stage sensor,
   wherein the controller is configured to determine whether the notch signal value is greater than or equal to a minimum value of notch signal values capable of remotely starting the manual transmission vehicle and the gear shift stage signal is a neutral stage signal, wherein the minimum value is based on the inclination angle signal value, and
   wherein in response to determining that the notch signal value is greater than or equal to the minimum value of the notch signal values, the controller is configured to start an engine of the manual transmission vehicle.

7. The device of claim 6, wherein the controller is configured to start the engine by operating a start motor of the manual transmission vehicle.

8. The device of claim 6, wherein the controller includes an engine controller configured to start the engine, and wherein the engine controller is configured to receive the gear shift stage signal.

* * * * *